(12) United States Patent
Attar

(10) Patent No.: US 8,750,187 B2
(45) Date of Patent: Jun. 10, 2014

(54) DATA DRIVEN ADAPTIVE RECEIVE CHAIN DIVERSITY PROCESSING

(75) Inventor: Rashid Ahmed Akbar Attar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 13/107,612

(22) Filed: May 13, 2011

(65) Prior Publication Data

US 2012/0287815 A1 Nov. 15, 2012

(51) Int. Cl.
*H04B 1/16* (2006.01)
*G08C 17/00* (2006.01)

(52) U.S. Cl.
USPC ........................................ 370/311; 455/343.1

(58) Field of Classification Search
USPC ...................... 370/311; 455/273, 278.1, 343.1
See application file for complete search history.

(56) References Cited

U.S. PATENT DOCUMENTS

| 4,013,962 | A * | 3/1977 | Beseke et al. ................. 455/135 |
| 6,584,330 | B1 * | 6/2003 | Ruuska ......................... 455/574 |
| 7,302,244 | B2 | 11/2007 | Spencer et al. |
| 7,349,720 | B2 | 3/2008 | Sandhu |
| 7,925,302 | B2 | 4/2011 | Ulupinar et al. |
| 2003/0143959 | A1 * | 7/2003 | Harris et al. ..................... 455/77 |
| 2004/0253955 | A1 * | 12/2004 | Love et al. ..................... 455/442 |
| 2005/0237971 | A1 * | 10/2005 | Skraparlis ..................... 370/329 |
| 2007/0014235 | A1 | 1/2007 | Stephens |
| 2008/0220819 | A1 | 9/2008 | Ben-Eli |
| 2009/0017766 | A1 | 1/2009 | Patel et al. |
| 2009/0033550 | A1 * | 2/2009 | Wolf .......................... 342/357.1 |
| 2009/0111406 | A1 | 4/2009 | Posti et al. |
| 2009/0197549 | A1 | 8/2009 | Ben-Ayun et al. |
| 2010/0100755 | A1 * | 4/2010 | Lin et al. ........................ 713/324 |
| 2010/0130219 | A1 * | 5/2010 | Cave et al. ..................... 455/450 |
| 2010/0210235 | A1 * | 8/2010 | Ulupinar et al. ............. 455/278.1 |
| 2012/0063377 | A1 * | 3/2012 | Osterling et al. .............. 370/311 |
| 2012/0101392 | A1 * | 4/2012 | Bhunia et al. ................. 600/483 |
| 2012/0250600 | A1 * | 10/2012 | Aragon et al. ................. 370/311 |
| 2012/0287829 | A1 * | 11/2012 | Chang et al. .................. 370/296 |
| 2013/0237171 | A1 * | 9/2013 | Lindoff et al. .............. 455/343.1 |

FOREIGN PATENT DOCUMENTS

| EP | 1780908 A2 | 5/2007 |
| JP | 2000332665 A | 11/2000 |
| WO | 03030403 A1 | 4/2003 |

OTHER PUBLICATIONS

International Search Report and Written Opinion—PCT/US2012/037126—ISA/EPO—Sep. 10, 2012.

* cited by examiner

*Primary Examiner* — Michael Thier
*Assistant Examiner* — Yaotang Wang
(74) *Attorney, Agent, or Firm* — Jeffrey D. Jacobs

(57) ABSTRACT

Methods, systems, and devices are described for receive chain diversity processing in a mobile wireless device. When data is not being received at the mobile device, the diversity receive chain(s) may be disabled in order to reduce power consumed at the mobile device. The diversity receive chain(s) may be enabled/disabled according to one or more different algorithms based on idle time from the receipt and/or transmission of data. The amount of idle time that triggers the disabling of a diversity receive chain may be adaptive based on historical usage of the mobile device, or based on activity on the transmit chain of the mobile device.

48 Claims, 11 Drawing Sheets

DATA DRIVEN ADAPTIVE RECEIVE CHAIN DIVERSITY PROCESSING

BACKGROUND

The following relates generally to wireless communication, and more specifically to power consumption reduction in mobile devices in wireless communications systems through reduction in receive chain diversity processing. Wireless communications systems are widely deployed to provide various types of communication content such as voice, video, packet data, messaging, broadcast, and so on. These systems may be accessed by mobile devices of multiple users sharing the available system resources (e.g., time, frequency, and power). Examples of such wireless communications systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Generally, a mobile device may be used to receive voice and/or data communications through the wireless communication systems. When receiving data communications, it is generally desirable to have relatively high data rates for communications to and from the mobile devices in order to enhance user experience. One commonly used technique to increase data rates uses multiple receive and/or transmit chains to receive and/or send data communications on multiple wireless communications channels simultaneously. Often, data is sent from a mobile device using a single transmit chain using a primary antenna that operates in duplex with a receive chain that uses the primary antenna, and a second receive chain, commonly referred to as a diversity receive chain, that uses a secondary antenna.

The use of multiple transmit and/or receive chains is effective in enhancing user experience through higher data transmission rates. However, the use of multiple transmit and/or receive chains may also adversely impact power consumption in the mobile device. Such mobile devices are generally battery operated, and it is desirable to increase the amount of time a mobile device can operate using only battery power.

SUMMARY

The described features generally relate to one or more improved systems, methods, and/or apparatuses for adaptively enabling and disabling diversity receive chains in mobile devices. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

An exemplary wireless communications apparatus includes: a receiver module comprising a first receive chain configured to receive wireless communications on first wireless communications channel and a second receive chain configured to receive wireless communications on a second wireless communications channel; and a control module, communicatively coupled with the first receive chain and second receive chain, and configured to: enable the first and second receive chains when wireless communications are received at the first receive chain; monitor an elapsed idle time during which wireless communications directed to the wireless communications apparatus are idle; and disable the second receive chain when the elapsed idle time exceeds a predetermined threshold. The first receive chain may be a primary receive chain, and the second receive chain may be a diversity receive chain.

Also or alternatively, embodiments of the apparatus may include a third receive chain configured to receive wireless communications on a third wireless communications channel, and wherein the control module is communicatively coupled with the third receive chain and further configured to: enable the first, second, and third receive chains when wireless communications are received at the first receive chain; monitor an elapsed idle time during which wireless communications directed to the wireless communications apparatus are idle; and disable the second and third receive chains when the elapsed idle time exceeds the predetermined threshold.

Also or alternatively, embodiments of the apparatus may include a transmitter module comprising a transmit chain configured to transmit wireless communications, the transmitter module communicatively coupled with the control module; and wherein the control module is further configured to enable the first and second receive chains when wireless communications are transmitted using the transmit chain.

Embodiments of such an apparatus may include one or more of the following features: the transmit chain and first receive chain are communicatively coupled to a first antenna and transmit and receive wireless communications in duplex using the first antenna; the second receive chain is communicatively coupled to a second antenna and receives wireless communications using the second antenna; the predetermined threshold is set based on activity on the transmit chain; the predetermined threshold is increased when there is activity on the transmit chain, and the predetermined threshold is decreased when there is no activity on the transmit chain; the predetermined threshold is adaptive based on historical usage data for the wireless communications apparatus; the predetermined threshold is increased during time periods when historical usage data indicates increased use of the wireless communications apparatus; and the predetermined threshold (i) is set at a first value when historical usage data indicates neither increased or decreased likelihood of receiving wireless communications directed to the wireless communications apparatus, (ii) is set at a second value corresponding to a longer elapsed idle time than the first value when historical usage data indicates increased likelihood of receiving wireless communications directed to the wireless communications apparatus, and (iii) is set at a third value corresponding to a shorter elapsed idle time than the first time period when historical usage data indicates decreased likelihood of receiving wireless communications directed to the wireless communications apparatus.

Also or alternatively, embodiments of the apparatus may include a control module further configured to determine a data rate for data reception on the first receive chain when wireless communications are received at the wireless communications apparatus, and disable the second receive chain when the data rate meets a predefined data rate threshold. The predefined data rate threshold may correspond to a maximum achievable data rate for the first receive chain. Embodiments of such an apparatus may also include a third receive chain configured to receive wireless communications on a third wireless communications channel, and wherein the control module is further configured to disable one or more of the second and third receive chains when the data rate meets one or more predefined data rate thresholds. Also, or alternatively, the control module may be configured to determine a Signal to Interference-plus-Noise Ratio (SINR) for data reception on the first receive chain and disable the second receive chain when the SINR meets or exceeds a predefined SINR threshold.

Also or alternatively, embodiments of the apparatus may include a third receive chain configured to receive wireless communications on a third wireless communications channel, and wherein the control module is communicatively coupled with the third receive chain and further configured to: enable the first and second receive chains when wireless communications are received; determine a type of data received at the first receive chain; and enable the third receive chain based on the type of data received.

An exemplary method for reducing power consumption in a wireless communications apparatus includes: receiving, using a first receive chain, wireless communications on a first wireless communications channel; receiving, using a second receive chain, wireless communications on a second wireless communications channel; monitoring an elapsed idle time during which wireless communications directed to the wireless communications apparatus are idle; disabling the second receive chain when the elapsed idle time exceeds a predetermined threshold; and enabling the second receive chain when wireless communications directed to the wireless communications apparatus are received at the first receive chain.

Also or alternatively, embodiments of the method may include: receiving, using a third receive chain, wireless communications on a third wireless communications channel; disabling the third receive chain when the elapsed idle time exceeds the predetermined threshold; and enabling the third receive chain when wireless communications directed to the wireless communications apparatus are received at the first receive chain.

Also or alternatively, embodiments of the method may include: receiving, using a third receive chain, wireless communications on a third wireless communications channel; determining a data rate for data reception on one or more of the first and second receive chains; and disabling one or more of the second and third receive chains when the data rate meets one or more predefined data rate thresholds.

Also or alternatively, embodiments of the method may include: determining a type of data being received from on the first and second receive chains; and enabling at least a third receive chain based on the type of data being received.

Also or alternatively, embodiments of the method may include: transmitting, using a transmit chain, wireless communications from the wireless communications apparatus; enabling the second receive chain when wireless communications are transmitted using the transmit chain; monitoring elapsed idle time during which wireless communications directed to the wireless communications apparatus are idle; and disabling the second receive chain when the elapsed idle time exceeds the predetermined threshold.

Embodiments of the method may include one or more of the following features: adjusting the predetermined threshold based on activity on the transmit chain; increasing the predetermined threshold when there is activity on the transmit chain, and decreasing the predetermined threshold when there is no activity on the transmit chain; adjusting the predetermined threshold based on historical usage data for the wireless communications apparatus; increasing the predetermined threshold during time periods when historical usage data indicates increased use of the wireless communications apparatus; setting a first predetermined threshold when historical usage data indicates neither increased or decreased likelihood of wireless communications, setting a second predetermined threshold that corresponds to a longer elapsed idle time than the first predetermined threshold when historical usage data indicates increased likelihood of wireless communications, and setting a third predetermined threshold that corresponds to a shorter elapsed idle time than the first predetermined threshold when historical usage data indicates decreased likelihood of wireless communications.

Also or alternatively, embodiments of the method may include one or more of the following features: determining a data rate for data reception on the first receive chain, and disabling the second receive chain when the data rate meets a predefined threshold; the predefined threshold corresponds to a maximum achievable data rate for the first receive chain; and determining a Signal to Interference-plus-Noise Ratio (SINR) for data reception on the first receive chain, and disabling the second receive chain when the SINR meets or exceeds a predefined threshold.

Another exemplary wireless communications apparatus includes: first receiving means for receiving wireless communications on a first wireless communications channel; second receiving means for receiving wireless communications on a second wireless communications channel; means for monitoring an elapsed idle time during which wireless communications directed to the wireless communications apparatus are idle; means for disabling the second receiving means when the elapsed idle time exceeds a predetermined threshold; and means for enabling the second receiving means when wireless communications directed to the wireless communications apparatus are received at the first receiving means.

Also or alternatively, embodiments of the apparatus may include: third receiving means for receiving wireless communications on a third wireless communications channel; means for disabling the third receiving means when the elapsed idle time exceeds the predetermined threshold; and means enabling the third receiving means when wireless communications directed to the wireless communications apparatus are received at the first receiving means.

Also or alternatively, embodiments of the apparatus may include: third receiving means for receiving wireless communications on a third wireless communications channel; means for determining a data rate for data reception on one or more of the first and second receiving means; and means for disabling one or more of the second and third receiving means when the data rate meets one or more predefined data rate thresholds.

Also or alternatively, embodiments of the apparatus may include: third receiving means for receiving wireless communications on a third wireless communications channel; means for determining a type of data being received from on the first and second receiving means; and means for enabling the third receiving means based on the type of data being received.

Also or alternatively, embodiments of the apparatus may include: transmitting means for transmitting wireless communications from the wireless communications apparatus; means for enabling the second receiving means when wireless communications are transmitted using the transmit chain; means for monitoring elapsed idle time during which wireless communications directed to the wireless communications apparatus are idle; and means for disabling the second receiving means when the elapsed idle time exceeds the predetermined threshold.

Embodiments of the apparatus may include one or more of the following features: the transmitting means and first receiving means are interconnected to a first antenna and transmit and receive wireless communications in duplex using the first antenna; means for adjusting the predetermined threshold based on activity on the transmitting means, the adjusting may comprise increasing the predetermined threshold when there is activity on the transmitting means and decreasing the predetermined threshold when there is no activity on the transmitting means; means for adjusting the predetermined threshold based on historical usage data for the wireless communications apparatus; means for increasing the predetermined threshold during time periods when historical usage data indicates increased use of the wireless communications apparatus.

Also or alternatively, embodiments of the apparatus may include adjusting means for: setting a first predetermined threshold when historical usage data indicates neither increased or decreased likelihood of wireless communications; setting a second predetermined threshold that corresponds to a longer elapsed idle time than the first predetermined threshold when historical usage data indicates increased likelihood of wireless communications; and setting a third predetermined threshold that corresponds to a shorter elapsed idle time than the first predetermined threshold when historical usage data indicates decreased likelihood of wireless communications.

Also or alternatively, embodiments of the apparatus may include: means for determining a data rate for data reception on the first receiving means; and wherein the means for disabling the second receiving means disable the second receiving means when the data rate meets a predefined threshold. The predefined threshold may correspond to a maximum achievable data rate for the first receiving means.

Also or alternatively, embodiments of the apparatus may also include: means for determining a Signal to Interference-plus-Noise Ratio (SINR) for data reception on the first receiving means; and wherein the means for disabling the second receiving means disable the second receiving means the SINR meets or exceeds a predefined threshold.

An exemplary computer program product includes computer-readable medium comprising: code for receiving, using a first receive chain, wireless communications on a first wireless communications channel; code for receiving, using a second receive chain, wireless communications on a second wireless communications channel; code for monitoring an elapsed idle time during which wireless communications directed to the wireless communications apparatus are idle; code for disabling the second receive chain when the elapsed idle time exceeds a predetermined threshold; and code for enabling the second receive chain when wireless communications directed to the wireless communications apparatus are received at the first receive chain.

Embodiments of such a computer program product may also include: code for receiving, using a third receive chain, wireless communications on a third wireless communications channel; code for disabling the third receive chain when the elapsed idle time exceeds the predetermined threshold; and code for enabling the third receive chain when wireless communications directed to the wireless communications apparatus are received at the first receive chain.

Also or alternatively, embodiments of such a computer program product may include: code for receiving, using a third receive chain, wireless communications on a third wireless communications channel; code for determining a data rate for data reception on one or more of the first and second receive chains; and code for disabling one or more of the second and third receive chains when the data rate meets one or more predefined data rate thresholds.

Also or alternatively, embodiments of such a computer program product may include: code for determining a type of data being received from on the first and second receive chains; and code for enabling at least a third receive chain based on the type of data being received.

Also or alternatively, embodiments of such a computer program product may include: code for transmitting, using a transmit chain, wireless communications from the wireless communications apparatus; code for enabling the second receive chain when wireless communications are transmitted using the transmit chain; code for monitoring elapsed idle time during which wireless communications directed to the wireless communications apparatus are idle; and code for disabling the second receive chain when the elapsed idle time exceeds the predetermined threshold.

Embodiments of such a computer program product may also include one or more of the following features: code for adjusting the predetermined threshold based on activity on the transmit chain; code for increasing the predetermined threshold when there is activity on the transmit chain; code for decreasing the predetermined threshold when there is no activity on the transmit chain; code for adjusting the predetermined threshold based on historical usage data for the wireless communications apparatus; code for increasing the predetermined threshold during time periods when historical usage data indicates increased use of the wireless communications apparatus; code for determining a data rate for data reception on the first receive chain; and code for disabling the second receive chain when the data rate meets a predefined threshold.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Management of receive chain diversity processing in a mobile wireless device in a wireless communications system is described. When no data is being received at the mobile device, the diversity receive chain may be disabled in order to reduce power consumed at the mobile device. The diversity receive chain may be disabled according to one or more different algorithms based on idle time from the receipt and/or transmission of data. The amount of idle time that triggers the disabling of the diversity receive chain may be adaptive. In one example, the mobile device receives wireless communications using both primary and diversity receive chains. When wireless communications directed to the mobile device are idle, elapsed idle time is monitored and the diversity receive chain is disabled when the elapsed idle time exceeds a predetermined threshold. The mobile device may use different algorithms when receiving voice communications, data communications, and voice and data communications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
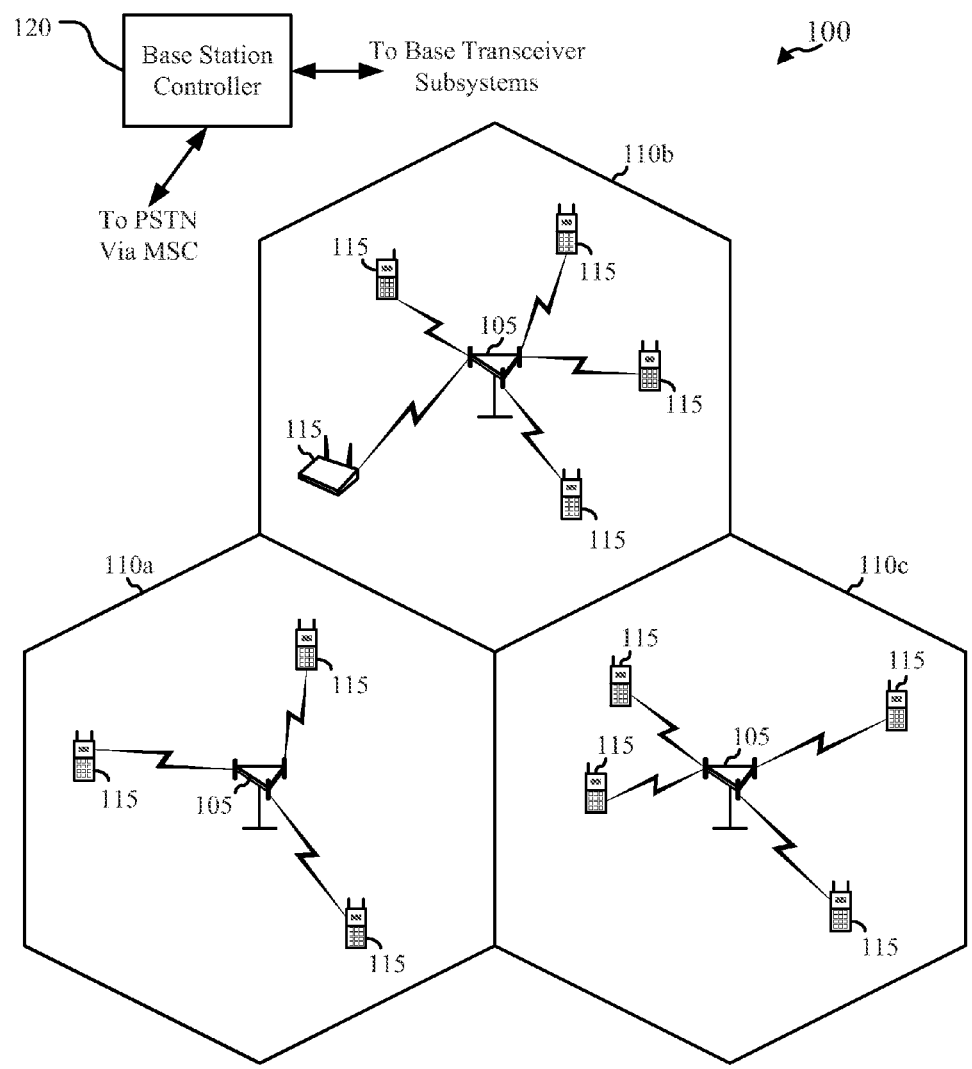
FIG. 1 illustrates a block diagram of a wireless communications system in which the methods and apparatus disclosed herein may be utilized.

Referring first to FIG. 1, a block diagram illustrates an example of a wireless communications system 100. The system 100 includes base stations 105, mobile devices 115, and a base station controller 120, and a core network 125 (the controller 120 may be integrated into the core network 125). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, an SC-FDMA signal, etc. Each modulated signal may be sent on a different carrier and may carry control information (e.g., pilot signals), overhead information, data, etc. The system 100 may be a multi-carrier LTE network capable of efficiently allocating network resources.

The base stations 105 may wirelessly communicate with the mobile devices 115 via a base station antenna. The base stations 105 are configured to communicate with the mobile devices 115 under the control of the controller 120 via multiple carriers. Each of the base station 105 sites can provide communication coverage for a respective geographic area. The coverage area for each base station here is identified as 110-a, 110-b, or 110-c. The coverage area for a base station may be divided into sectors (not shown, but making up only a portion of the coverage area). The system 100 may include base stations 105 of different types (e.g., macro, micro, and/or pico base stations).

The mobile devices 115 may be dispersed throughout the coverage areas 110. The mobile devices 115 may be referred to as mobile stations, mobile devices, access terminals (ATs), user equipments (UEs) or subscriber units. The mobile devices 115 may include cellular phones and wireless communications devices, but may also include personal digital assistants (PDAs), other handheld devices, netbooks, notebook computers, etc.

Different network scaling down modes can be considered depending on the network types and service goals. There are various ways of utilizing the channel and spatial resources in the network. Consider a wireless network that has multiple carriers over different sites. Different carriers can be used all for a single radio access technology (RAT) or multiple radio access technologies (multi-RAT) (e.g., N1 UMTS carriers and N2 GSM carriers). Different modalities of scaling down the carrier and site dimensions may be defined. The following graphs in FIGS. 2-6 illustrate various scaling down principles. Each y-axis 205 illustrates different carriers, and each x-axis 210 illustrates different sites, or different sectors. The shaded squares indicate whether a particular carrier is turned on for a given site or sector.

Figure 2:
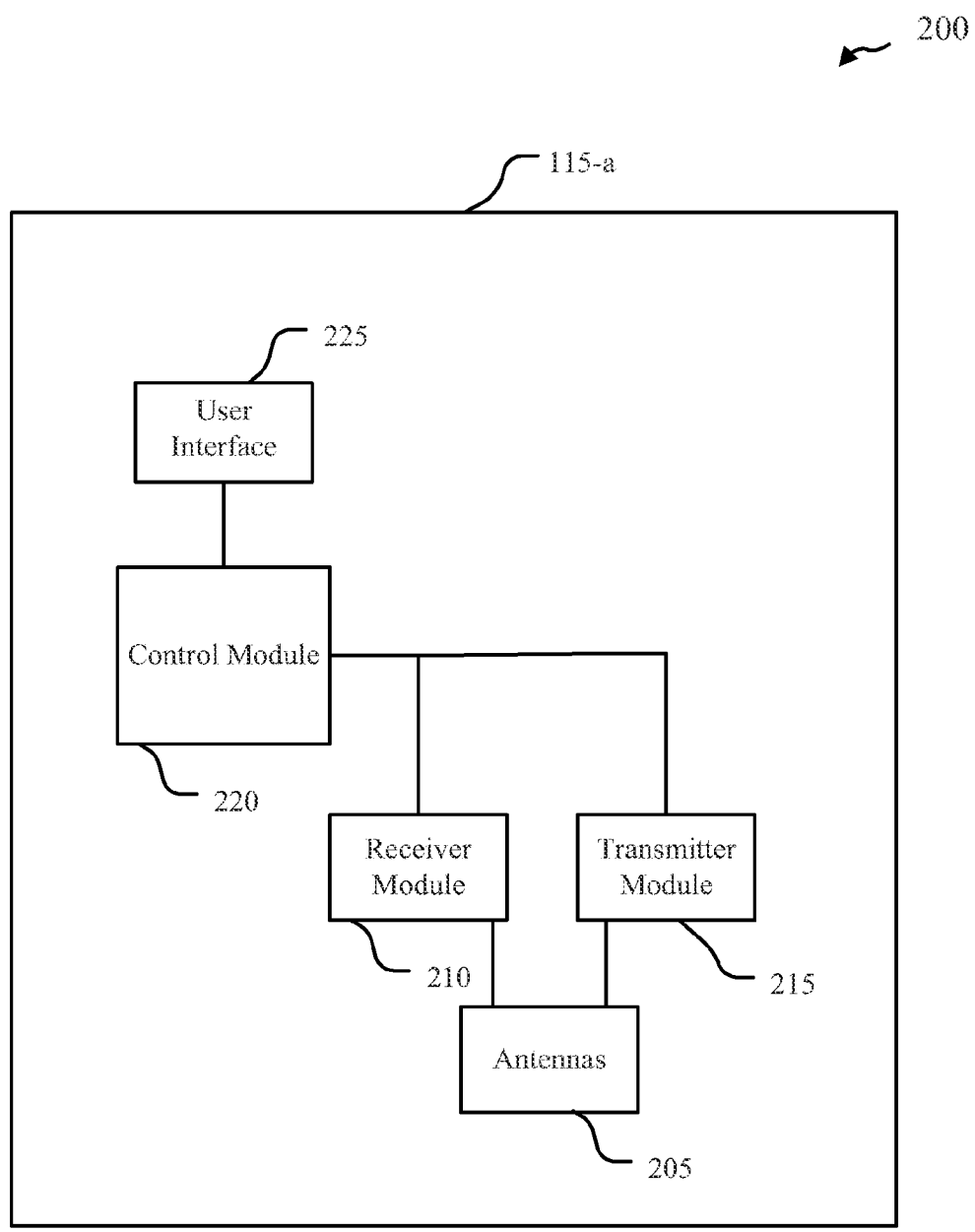
FIG. 2 illustrates a block diagram of an exemplary wireless mobile device.

With reference now to FIG. 2, a block diagram illustration 200 of a mobile device 115-a is described. The mobile device 115-a may have any number of different configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-a may have a mobile configuration, having an internal power supply (not shown), such as a battery, to facilitate mobile operation. The mobile device 115-a includes two or more antennas 205, which may be used in the transmission/reception of wireless communications to/from the mobile device 115-a. In some embodiments, the antennas 205 include a primary antenna and a secondary antenna, with the primary antenna used for transmission and reception of wireless communications on a wireless communications channel, and the secondary antenna used for reception of wireless communications on a different wireless communications channel. In some devices, wireless communications can be received on more than two wireless communications channels, with such devices including additional antennas as necessary to receive wireless communications on three or more different wireless communications channels. A receiver module 210 and a transmitter module 215 are coupled to the antennas. The receiver module 210 receives signals from the antennas, demodulates and processes the signals, and provides the processed signals to a control module 220. Similarly, the transmitter module 215 receives signals from the control module 220, processes and modulates the signals and transmits the processed and modulated signals using the antennas 205. In some embodiments, the transmitter module 215 and receiver module 210 may be incorporated into a single transceiver module. The control module 220 performs processing tasks related to the operation of the mobile device 115-a, and is coupled to a user interface 225 that allows a user of the mobile device 115-a to select various functions, control, and interact with the mobile device. The various components the mobile device 115-a may be in communication with some or all of the other components of the mobile device 115-a via a bus, for example.

Figure 3:
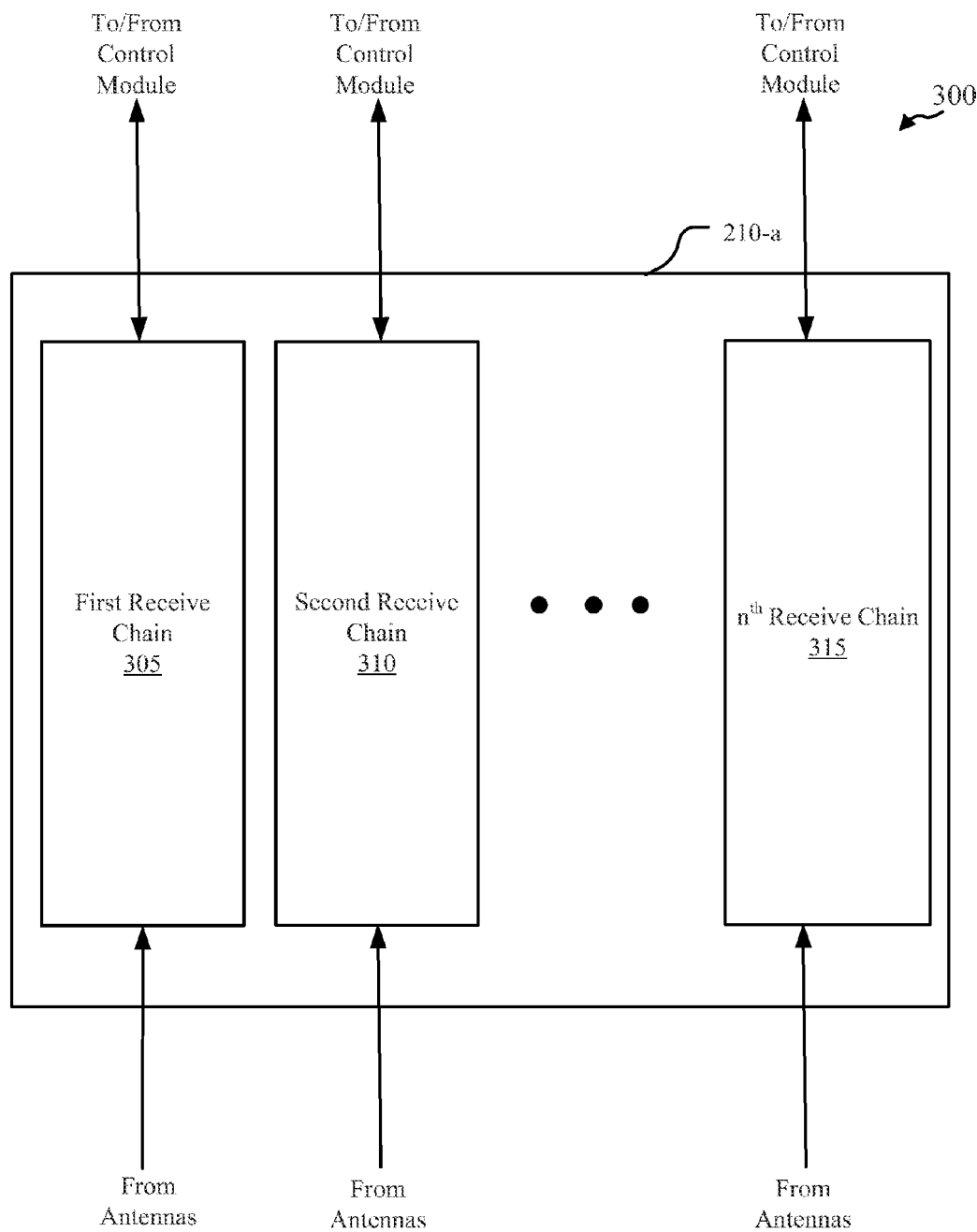
FIG. 3 illustrates a block diagram of an example of a receive module having two receive chains.

Referring now to FIG. 3, a block diagram illustration 300 of an exemplary receiver module 210-a is described. The receiver module 210-a of FIG. 3 includes multiple receive chains, including a first receive chain 305, a second receive chain 310, and an $n^{th}$ receive chain 315. Reference to several examples is made using two exemplary receive chains, with the understanding that more than two receive chains may be present in a receiver module, and two receive chains are described in various examples for discussion and illustration of the concept. Each of the receive chains 305, 310, 315 are coupled to antennas and receive wireless communications signals from the antennas. The first receive chain 305, in some embodiments, is coupled to a primary antenna of the mobile device and shares the primary antenna with the transmitter module (215 of FIG. 2). The second receive chain 310 and $n^{th}$ receive chain 315, in some embodiment, are coupled to a secondary antennas and are used as a diversity receive chains to provide an enhanced rate for reception of data at the mobile device. Each of the receive chains 305, 310 and 315, include components that are used in such receive chains. Such components are well understood and need not be described in detail here, and perform tasks related to reception and filtering of incoming signals, frequency conversion and gain control, and baseband processing of received signals to provide a digital output to the control module (220 of FIG. 2). In various embodiments, as will be described in more detail below, the second receive chain 310, and $n^{th}$ receive chain 315, are disabled under certain conditions to reduce overall power consumption of the mobile device.

Figure 4:
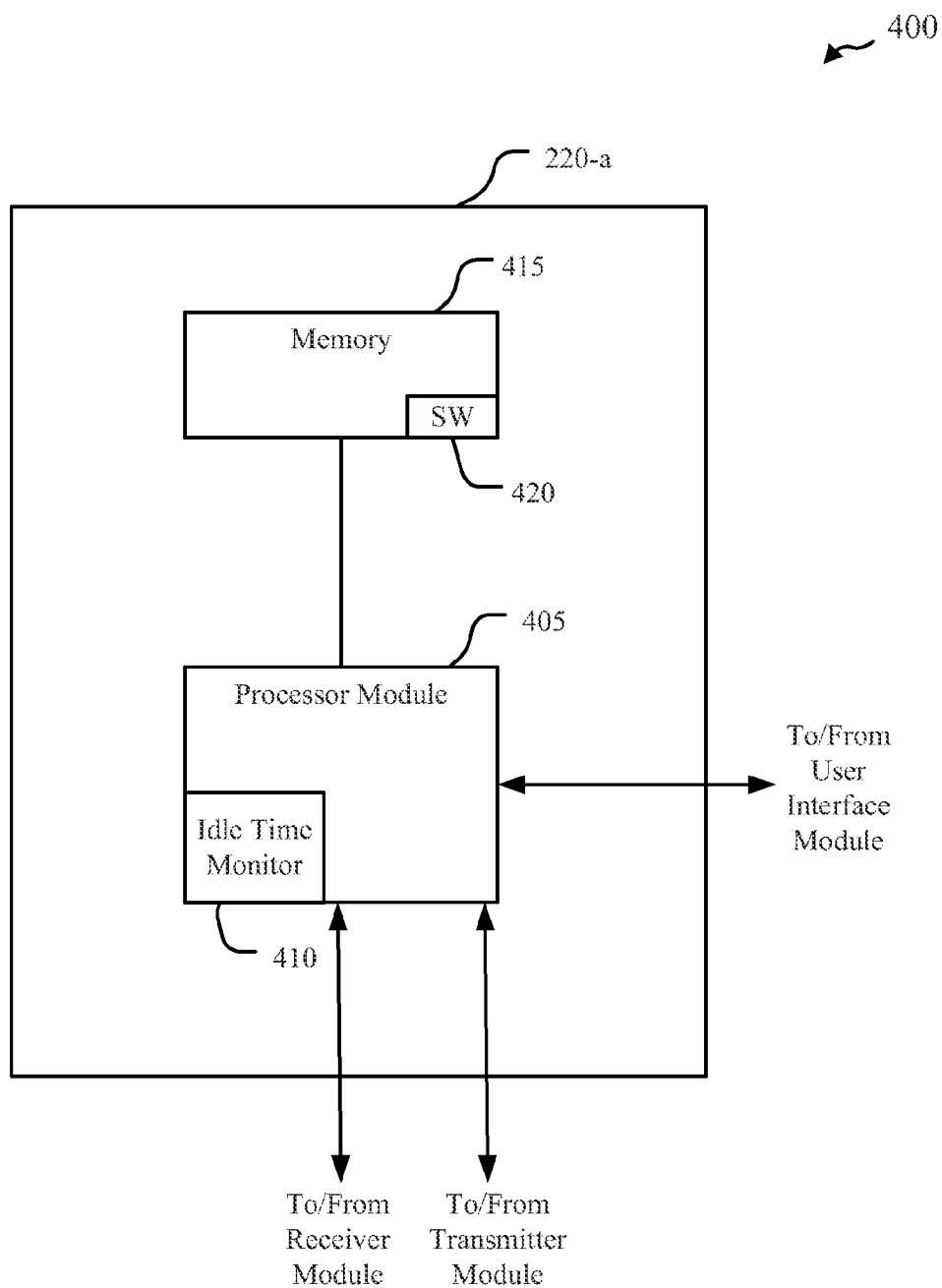
FIG. 4 illustrates a block diagram of an example of a control module.

FIG. 4 is a block diagram illustration 400 of a control module 220-a according to some exemplary embodiments. The control module 220-a includes a processor module 405 that includes an idle time monitor 410. The control module 220-a also includes a memory 415. The memory 415 may include random access memory (RAM) and read-only memory (ROM). The memory 415 may store computer-readable, computer-executable software code 420 containing instructions that are configured to, when executed, cause the processor module 405 to perform various functions of the mobile device (e.g., call processing, message routing, execution of applications, etc.). Alternatively, the software code 420 may not be directly executable by the processor module 405 but be configured to cause the processor module, e.g., when compiled and executed, to perform functions described herein. The software code 420 may also, when executed, cause the processor module 405 to track and record historical usage data relating to, for example, the days and times during which the user of the mobile device is more likely to use the mobile device to transmit and/or receive data. The historical usage data may be stored in memory 415 and accessed and updated as needed by the processor module 405.

The processor module 405 may include an intelligent hardware device, e.g., a central processing unit (CPU) such as those made by Intel® Corporation or AMD®, a microcontroller, an application specific integrated circuit (ASIC), etc. The processor module 405 may include a speech encoder (not shown) configured to receive audio via a microphone, convert the audio into packets (e.g., 30 ms in length) representative of the received audio, provide the audio packets to the transmitter module (215 of FIG. 2), and provide indications of whether a user is speaking. The processor module 405 may execute one or more applications that a user may access, through the user interface, to generate digital content that is to be transmitted from the mobile device. Such digital content may include email or text message communications, to name but two examples, that the processor module 405 may convert into data packets, and provide the data packets to the transmitter module.

According to the architecture of FIG. 4, the processor module 405 includes an idle time monitor 410. The idle time monitor 410 may be implemented as part of the software executed by the processor module 405. Alternatively, functionality of the idle time monitor 410 may be implemented as a component of the receiver module (210 of FIG. 2), as a computer program product, and/or as one or more separate controller elements of the control module 220-a. The idle time monitor 410, in some embodiments, monitors elapsed idle time since the receipt of wireless communications directed to the mobile device. The elapsed idle time, as will be described further below, may be used in determining to disable the second receive chain, for example. The mobile device will commonly receive a number of different wireless communications from various sources, as well as wireless communications directed specifically to the mobile device, such as a data communication generated from a push email service that is directed to the mobile device. When referring to wireless communications directed to the mobile device, reference is made to such directed communications, rather than the general overhead communications that are present in a wireless communication system.

Figure 5:
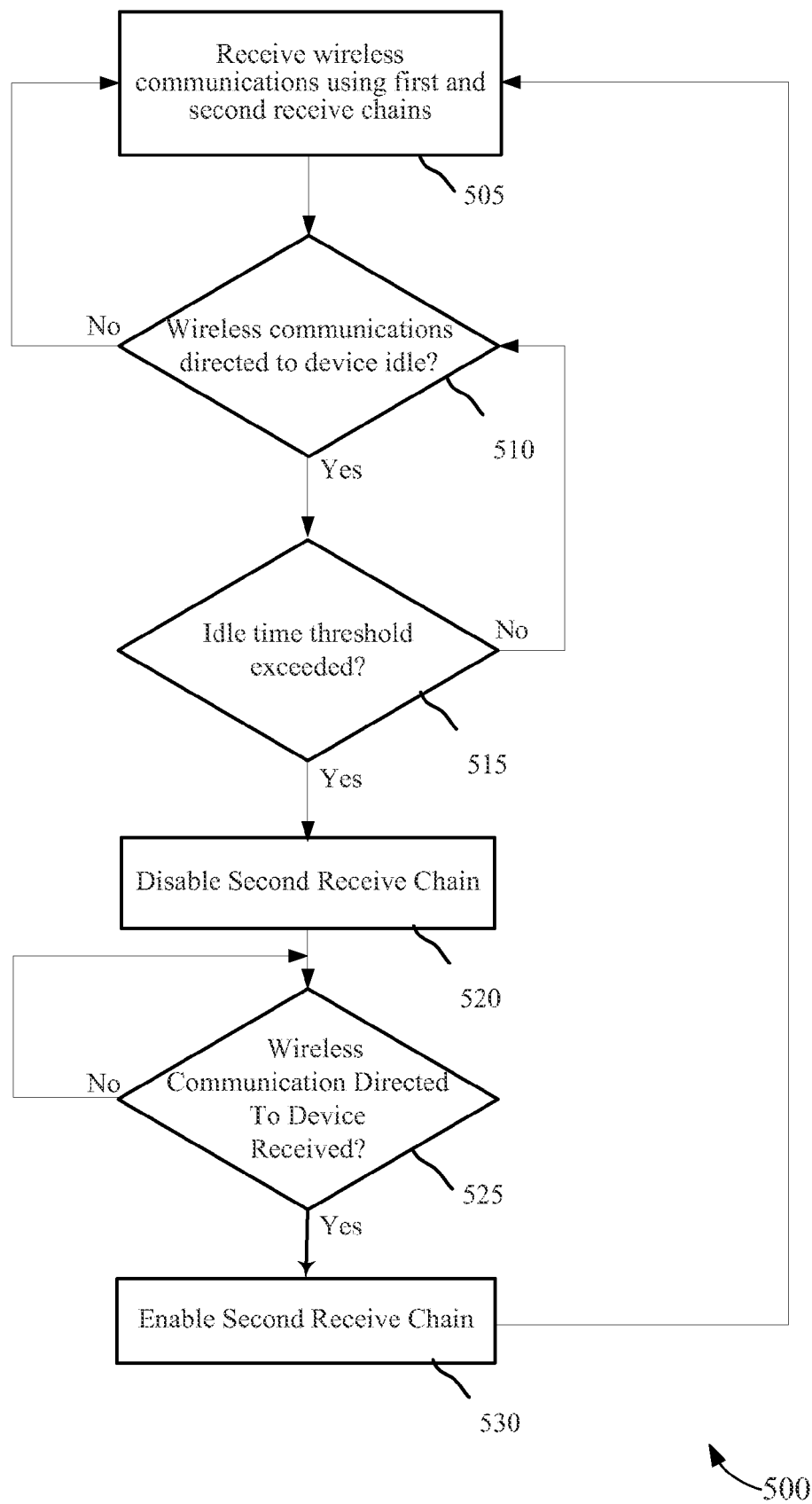
FIG. 5 is a flowchart of a method for diversity receive chain processing.

FIG. 5 is a flowchart of a method 500 for enabling and disabling the second receive chain in a mobile device according to various embodiments. The method 500 may be performed, for example, in whole or in part, mobile device 115-a of FIG. 2, or the processor module 405 of FIG. 4. At block 505, wireless communications are received at the mobile device using the first and second receive chains. Wireless data may be received from two separate wireless communications channels, one corresponding to the first, or primary, receive chain, and one corresponding to the second, or diversity, receive chain. At block 510, it is determined if wireless communications directed to the device are idle. Such a determination may be determined, for example, by monitoring for activity in the first or second receive chains. If wireless communications directed to the device are not idle, the method continues at block 505. If wireless communications directed to the device are idle, a determination is made, at block 515, if an idle time threshold is exceeded. Such a determination may be made by initiating a timer at an idle time monitor when it is initially determined that wireless communications are idle. If the elapsed time does not exceed the idle time threshold, the method continues at block 510. If the elapsed time does exceed the idle time threshold, the second receive chain is disabled at block 520. The idle time threshold may be set according to various different criteria, some examples of which are described herein. In one embodiment, the idle time threshold is set to a predetermined limit, such as 50 ms, for example. When wireless communications directed to the mobile device are not received for such a time period, this may indicate that the particular communications are complete and another communication directed to the mobile device may not be received for quite some time. Thus, the second receive chain may be disabled because it is likely to not be required for quite some time, thereby reducing overall power consumption of the device.

At block 525 it is determined if a wireless communication directed to the device has been received. If no communications are received, the method continues in the state with the second receive chain disabled. If wireless communications to the device are received, the second receive chain is again enabled at block 530 so as to provide an enhanced rate at which the device can receive data. The method then continues at block 505.

Figure 6:
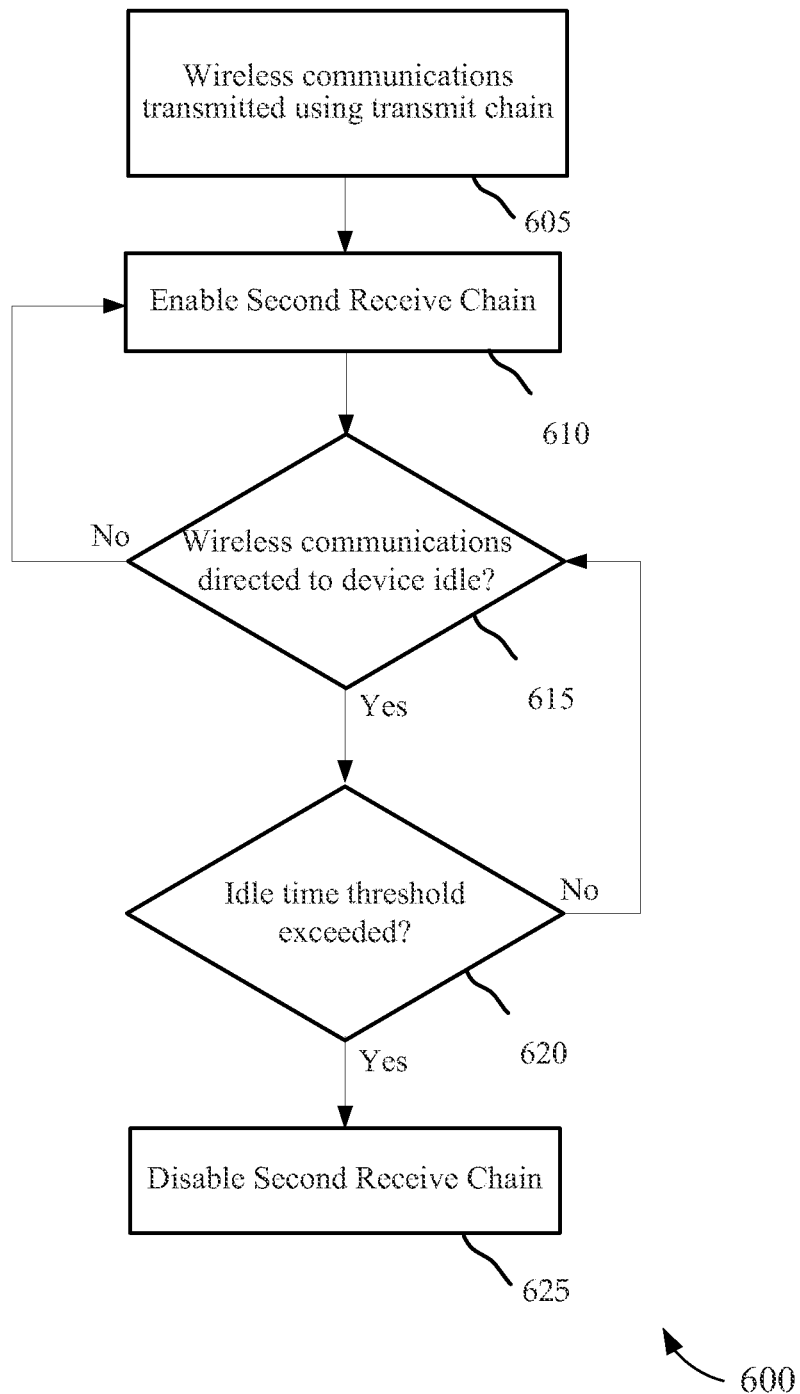
FIG. 6 is a flowchart of a method for diversity receive chain processing based on activity on a transmit chain.

FIG. 6 is a flowchart of another method 600 for enabling and disabling the second receive chain in a mobile device according to various embodiments. The method 600 may be performed, for example, in whole or in part, mobile device 115-a of FIG. 2, or the processor module 405 of FIG. 4. At block 605, wireless communications are transmitted from the mobile device using the transmit chain. As described above, wireless data may be received at the mobile device on two separate wireless communications channels, on the first and second receive chains. At block 610, the second receive chain is enabled. This is done in anticipation of receiving wireless communications directed to the mobile device in response to the transmission of wireless communications. At block 615, it is determined if wireless communications directed to the device are idle. Similarly as described above, such a determination may be made, for example, by monitoring for activity in the first or second receive chains. If wireless communications directed to the device are not idle, the method continues at block 610. If wireless communications directed to the device are idle, a determination is made, at block 620, if an idle time threshold is exceeded. Such a determination may be made by initiating a timer at an idle time monitor when it is initially determined that wireless communications are idle. If the elapsed time does not exceed the idle time threshold, the method continues at block 615. If the elapsed time does exceed the idle time threshold, the second receive chain is disabled at block 625. As discussed above, the idle time threshold may be set according to various different criteria, some examples of which are described herein.

Figure 7:
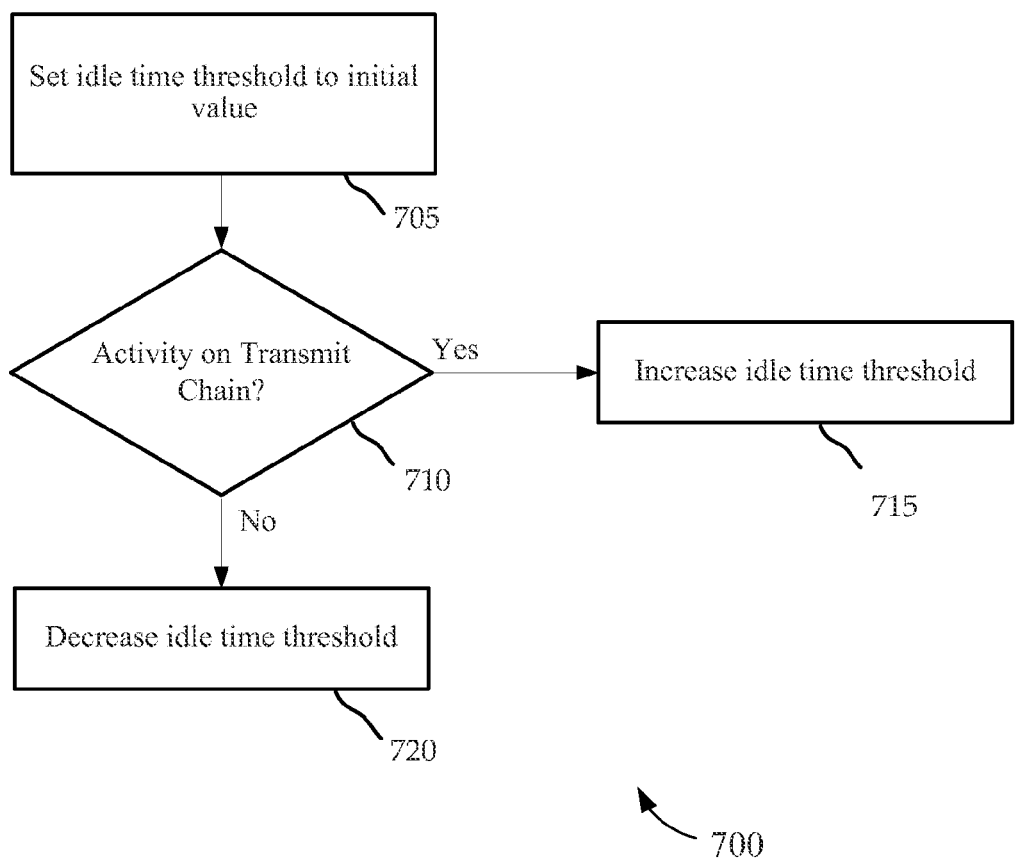
FIG. 7 is a flowchart of another method for diversity receive chain processing based on activity on a transmit chain.

As described with respect to the methods of FIGS. 5 and 6, an idle time threshold is used as the basis for determining whether to disable the second receive chain. The idle time threshold according to some embodiments is adjusted based on certain criteria that work to achieve both enhanced data rates and reduced overall power consumption. Referring now to FIG. 7, a method 700 for adjusting the idle time threshold is described. Initially, at block 705, the idle time threshold is set to an initial value. This value may be based on an average amount of time that would indicate that a data communication is complete, plus some additional time to account for some delays in the reception of wireless communications, such as network latency delays, etc. In one embodiment, an initial value for the idle time threshold is set to 50 ms, indicating that if wireless communications are not directed to the device for this time period, the wireless communications are likely complete, and need not be initiated again for some unknown time period. In the method 700, it is determined if there is any activity on the transmit chain 710. If there is activity on the transmit chain, the idle time threshold is increased at block 715. In such a case, the activity on the transmit chain may indicate that wireless communications directed to the mobile device are more likely to be received, and the idle time threshold is increased so as to not disable the second receive chain as quickly as it would otherwise be disabled. The amount of increase in the idle time threshold may be any suitable time such as, for example 10 ms. Depending upon the application of the mobile device, the increase in idle time may be different. If it is determined at block 710 that there is no activity on the transmit chain, the idle time threshold is decreased at block 720. Such a decrease in the idle time threshold acts to disable the second receive chain more quickly to reduce power consumption, and the lack of activity on the transmit chain may indicate that the mobile device is not currently in use, and therefore communications are not expected to be immediately received at the mobile device.

Figure 8:
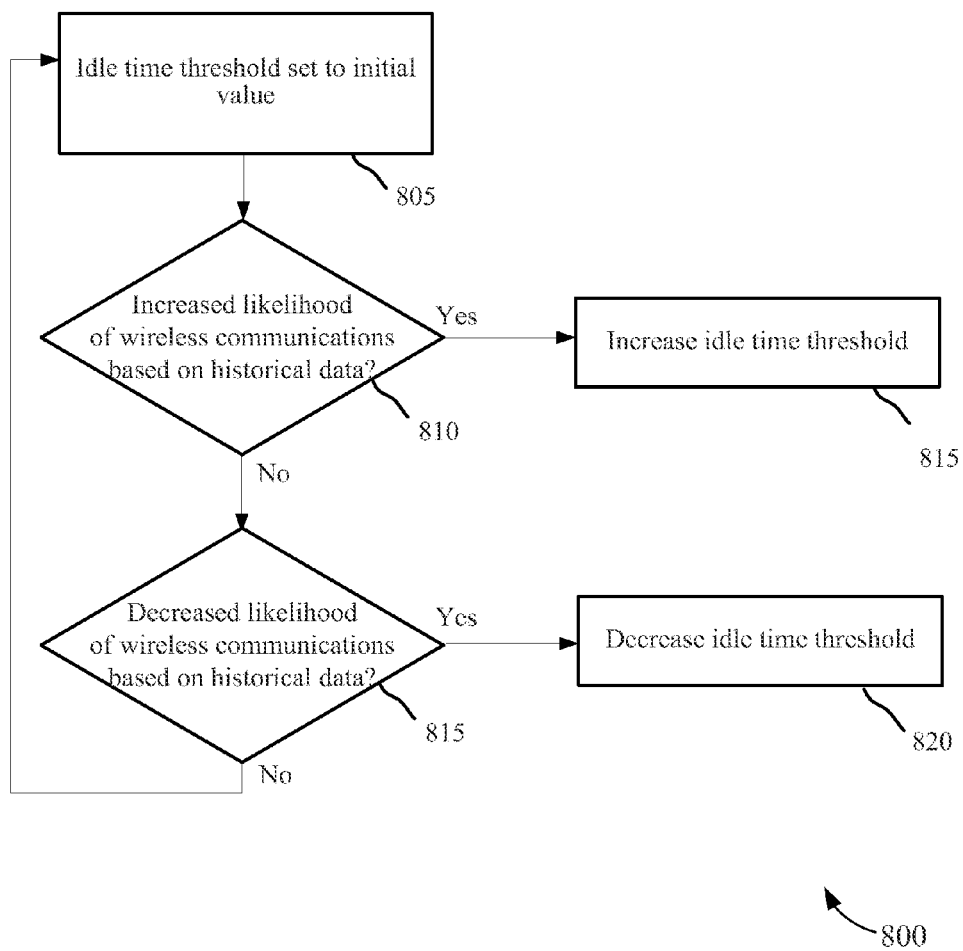
FIG. 8 is a flowchart of a method for diversity receive chain processing based on historical activity data.

Referring now to FIG. 8, another method 800 for adjusting the idle time threshold is described. Initially, at block 805, the idle time threshold is set to an initial value. Similarly as described above, this value may be based on an average amount of time that would indicate that a data communication is complete, plus some additional time to account for delays in the reception of wireless communications, such as network latency delays, etc. In one embodiment, an initial value for the idle time threshold is set to 50 ms, indicating that if wireless communications are not directed to the device for this time period, the wireless communications are likely complete, and need not be initiated again for some unknown time period. At block 810, historical usage of the mobile device is used as a basis for determining if there is an increased likelihood of wireless communication. Historical usage data may include data related to the times during a day, for example, when the mobile device typically receives and/of transmits more data, and times when the mobile device typically receives and/or transmits less data. For example, a user of a mobile device may use the device for wireless communications for a significant portion of business hours on a business day, then use the mobile device periodically little during non-business evening hours, and very rarely use the mobile device during nighttime hours. This usage data may be included in the historical data, and based on a current time of the day and/or day of the week, it may be determined that there is an increased likelihood of wireless communications. If it is determined at block 810 that there is an increased likelihood of wireless communications, the idle time threshold is increased according to block 815. The amount of the increase in idle time may be based on the amount of usage, or some other criteria. In cases where historical data indicates near constant usage during certain time periods, for example, the idle time threshold may be set to a very high threshold. If it is determined at block 810 that there is not an increased likelihood of wireless communications, the method determines, at block 820 if there is a decreased likelihood of wireless communications based on historical data. In the example described above, the historical data may indicate a decreased likelihood of wireless communications during nighttime hours. If it is determined that there is a decreased likelihood of wireless communications data, the idle time threshold is decreased at block 825. In this case, the second receive chain would be disabled more quickly, thereby reducing overall power consumption of the mobile device. If the historical data does not indicate an increased or decreased likelihood of wireless communications, the idle time threshold remains set to the initial value at block 805. One of skill in the art will readily recognize that numerous variations of such an adaptive threshold may be implemented, including varying amounts of idle time threshold adjustments and different levels of adjustment based on historical usage data.

Figure 9:
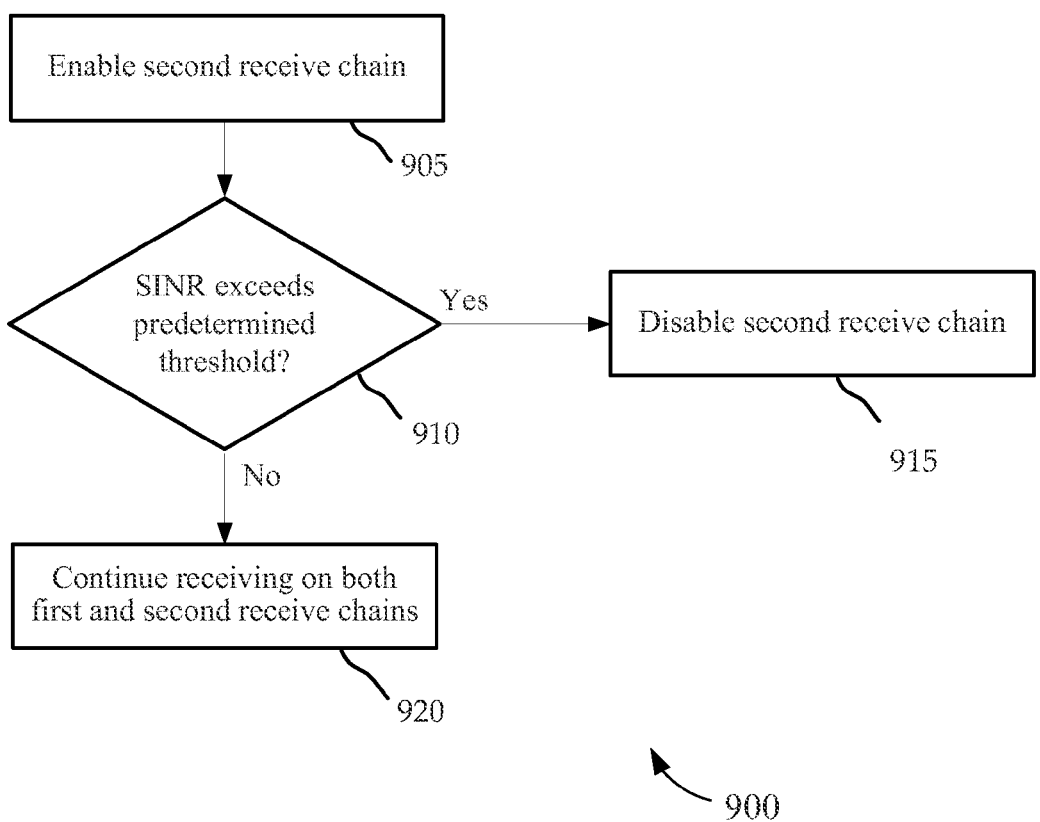
FIG. 9 is a flowchart of a method for diversity receive chain processing based on a Signal to Interference-plus-Noise Ratio.

FIG. 9 is a flowchart of a method 900 for enabling and disabling the second receive chain in a mobile device according to other embodiments. The method 900 may be performed, for example, in whole or in part, mobile device 115-*a* of FIG. 2, or the processor module 405 of FIG. 4. At block 905, wireless communications are received at the mobile device using the first and second receive chains, and the second receive chain is enabled. At block 910, it is determined if a Signal to Interference-plus-Noise Ratio (SINR) exceeds a predetermined threshold. If the SINR is above a predetermined threshold, this may indicate that the mobile device is able to receive communications on the first receive chain at the maximum available data rate, or at or above a requested data rate. In such a case, the second receive chain is disabled, according to block 915, because the second receive chain is therefore not required in order to receive data at the specified, or maximum, data rate. The second receive chain may thus be disabled and the overall power consumption of the mobile device reduced. The predetermined threshold may be a threshold data rate that is selectable by based on any of a number of factors, with the threshold data rate set at an amount appropriate for a particular device and/or application. For example, a mobile device may be designed to operate using a data rate of no more than 10 Mbit/s, and the predetermined threshold set to that data rate. If the first receive chain is operating to receive data at the 10 Mbit/s data rate, the second receive chain is disabled and the power consumption of the mobile device is thereby reduced. Of course, the predetermined threshold may be set to any suitable threshold amount based on the particular mobile device and the uses for the mobile device. If it is determined at block 910 that the SINR does not exceed the predetermined threshold, the mobile device continues receiving communications using both the first and second receive chains at block 920. The predetermined value of the SINR may be set according to a number of different factors, such as the particular application of the mobile device and data rates required or desired for such an application, and the value of SINR that would enable the first receive chain to achieve such data rates. In other embodiments, the data rate may be determined directly, and the second receive chain disabled when the measured data rate meets (or exceeds) a requested data rate or maximum data rate.

Figure 10:
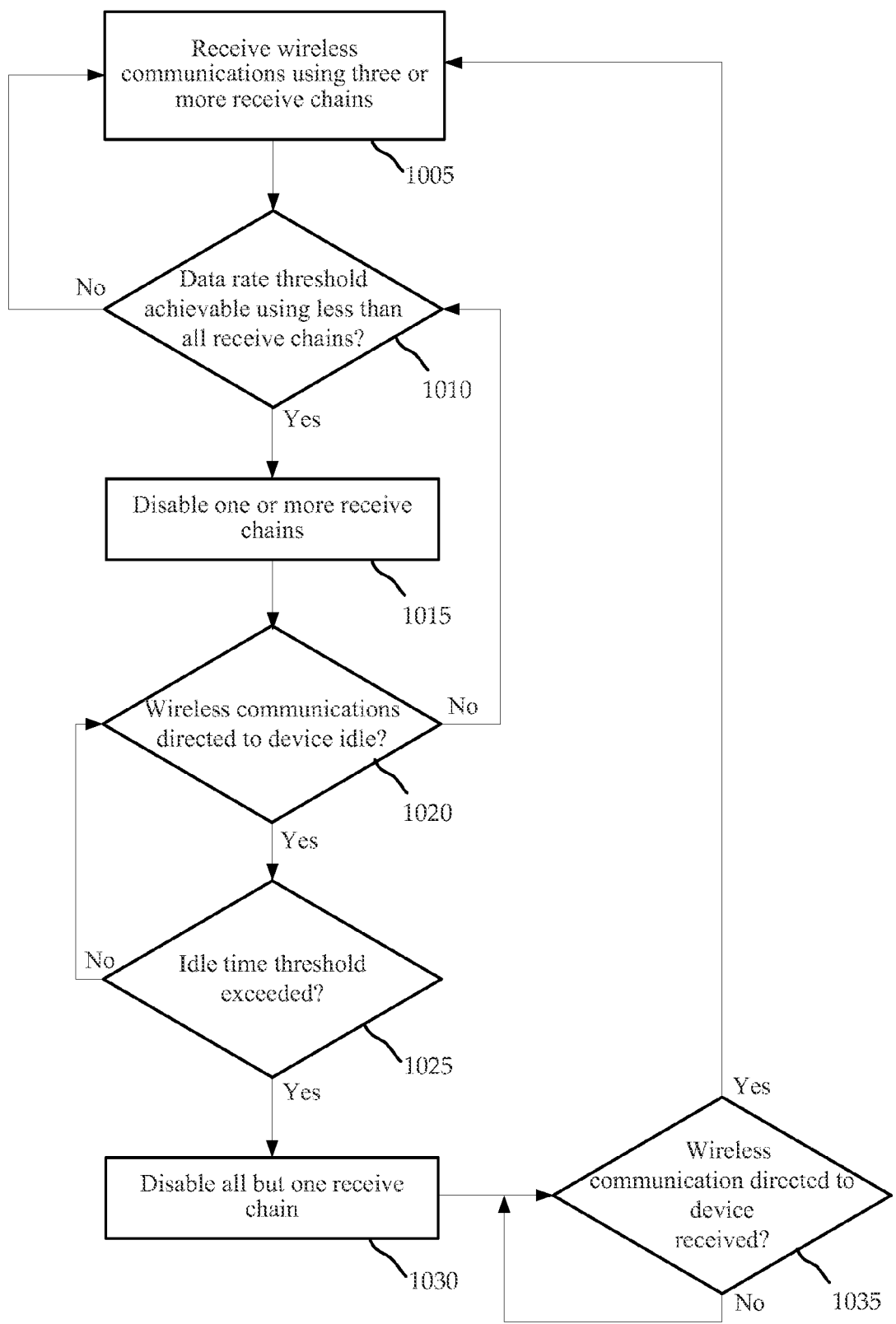
FIG. 10 is a flowchart of another method for diversity receive chain processing.

FIG. 10 is a flowchart of a method 1000 for enabling and disabling receive chains in a mobile device having three or more receive chains. The method 1000 may be performed, for example, in whole or in part, mobile device 115-a of FIG. 2, or the processor module 405 of FIG. 4. At block 1005, wireless communications are received at the mobile device using three or more receive chains. Wireless data may be received from multiple wireless communications channels, one corresponding to the first, or primary, receive chain, and others corresponding to the two or more diversity receive chains. At block 1010, it is determined if a data rate threshold is achievable using less than all of the available receive chains. Such a determination may be determined, for example, by monitoring data transmission rates on the various receive chains, or by determining if a SINR exceeds a predetermined threshold for one or more of the receive chains. If the data rate threshold is not achievable using less than all of the receive chains, the method continues at block 1005. If the data rate threshold is achievable using less than all of the receive chains, one or more of the receive chains are disabled, as noted at block 1015. For example, if the target data rate may be achieved using only primary receive chain, then all of the diversity receive chains are disabled. Similarly, if the target data rate may be achieved using a first and second receive chain, and the device includes three receive chains, the third receive chain may be disabled, thereby reducing overall power consumption while maintaining sufficient data rates.

At block 1020, it is determined if wireless communications to the device are idle. If wireless communications are not idle, the method continues at block 1010. If wireless communicational are idle, a determination is made, at block 1025, if an idle time threshold is exceeded. Such a determination may be made by initiating a timer at an idle time monitor when it is initially determined that wireless communications are idle. If the elapsed time does not exceed the idle time threshold, the method continues at block 1020. If the elapsed time does exceed the idle time threshold, all receive chains are disabled except one receive chain, as indicated at block 1030. Similarly as discussed above, the idle time threshold may be set according to various different criteria, some examples of which are described herein. The idle time threshold may be set to a predetermined limit, such as 50 ms, for example. When wireless communications directed to the mobile device are not received for such a time period, this may indicate that the particular communications are complete and another communication directed to the mobile device may not be received for quite some time. Thus, the diversity receive chains may be disabled because they are likely to not be required for quite some time, thereby reducing overall power consumption of the device. At block 1035 it is determined if a wireless communication directed to the device has been received. If no communications are received, the method continues in the state with the diversity receive chains disabled. If wireless communications to the device are received, the diversity receive chains are enabled, and the method then continues at block 1005. Thus, multiple receive chains may be used with different criteria provided for enabling and disabling one or more of the multiple receive chains.

Figure 11:
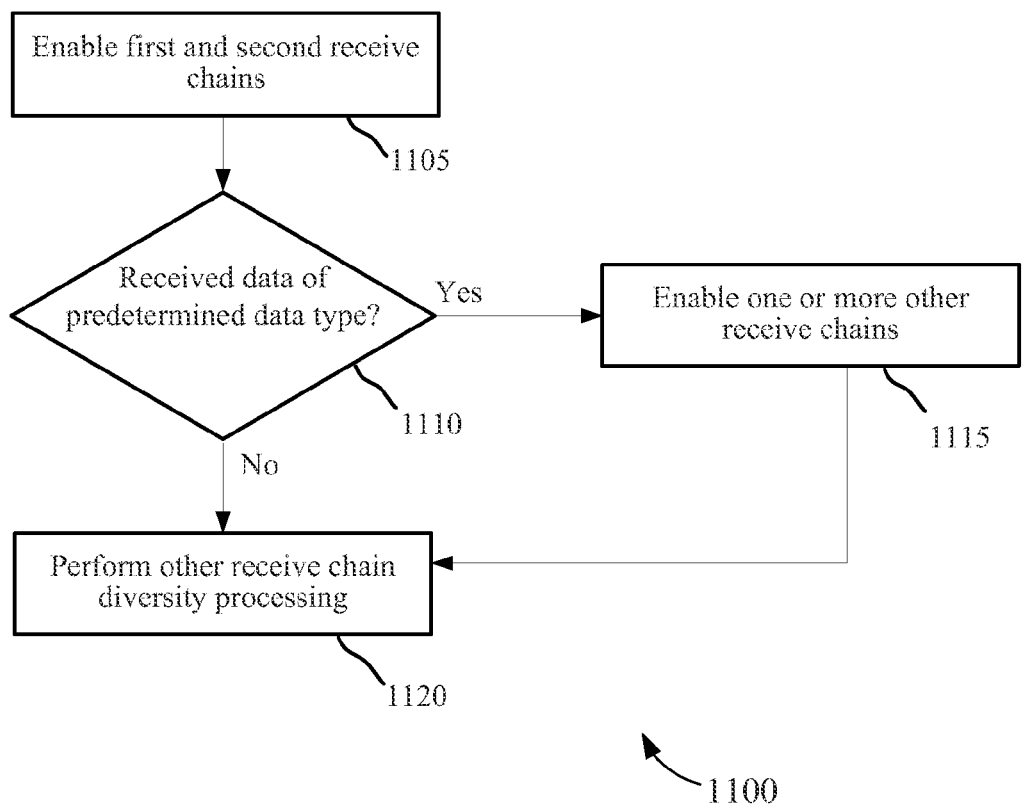
FIG. 11 is a flowchart of another method for diversity receive chain processing based on the type of data received.

FIG. 11 is a flowchart of a method 1100 for enabling and disabling two or more diversity receive chains in a mobile device. The method 1100 may be performed, for example, in whole or in part, mobile device 115-a of FIG. 2, or the processor module 405 of FIG. 4. At block 1105, first and second receive chains are enabled, and wireless communications are received at the mobile device using the receive chains. At block 1110, it is determined if the data received at the mobile device is of a predetermined type. Particular types of data may be desired to be received at relatively higher data rates, such as streaming video, while other types may not require such relatively higher data rates, such as email messages. A determination that data is of a predetermined data type may be made, for example, by monitoring the received data rate, as the number of bits/time, and when this value is high for some period of time, which suggests that there is a lot of data to be downloaded, identifying the received data as a predetermined data type. This determination may be made according to other criteria as well, such as such as through other information that may be received as a processor module (e.g., module 405 of FIG. 4). In the example of FIG. 11, a predetermined data type includes any type of data that is identified as data that is to be received at higher data rates. If it is determined that the received data is of a predetermined data type, the method continues to enable one or more other receive chains, as indicated at block 1115. Enabling other receive chains allows for increased data rates and the ability to receive the data at a higher data rate. If the received data is not a predetermined data type, or after additional receive chains are enabled, the method continues at block 1120 to perform other receive chain diversity processing, such as any of the processing as described above. The predetermined data types may be selectable based on any of a number of factors based on a particular device and/or application.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A wireless communications apparatus, comprising:
   a receiver module comprising a first receive chain configured to receive wireless communications on first wireless communications channel and a second receive chain configured to receive wireless communications on a second wireless communications channel; and
   a control module, communicatively coupled with the first receive chain and second receive chain, and configured to:
      enable the first and second receive chains when wireless communications are received at the first receive chain;
      monitor an elapsed idle time during which wireless communications on the first and second receive chains of the wireless communications apparatus are idle; and
      disable the second receive chain when the elapsed idle time exceeds a predetermined threshold, wherein the predetermined threshold is adaptive based at least in part on historical usage data, such that the predetermined threshold is increased based at least in part on a determination that the historical usage data indicates an increased likelihood of receiving wireless communications during a first time period, and such that the predetermined threshold is decreased based at least in part on a determination that the historical usage data indicates a decreased likelihood of receiving wireless communications during a second time period.

2. The apparatus of claim 1, wherein the first receive chain is a primary receive chain, and the second receive chain is a diversity receive chain.

3. The apparatus of claim 1, further comprising a third receive chain configured to receive wireless communications on a third wireless communications channel, and wherein the control module is communicatively coupled with the third receive chain and further configured to:
   enable the first, second, and third receive chains when wireless communications are received at the first receive chain;
   monitor an elapsed idle time during which wireless communications directed to the first, second, and third receive chains of the wireless communications apparatus are idle; and
   disable the second and third receive chains when the elapsed idle time exceeds the predetermined threshold.

4. The apparatus of claim 1, further comprising:
   a transmitter module comprising a transmit chain configured to transmit wireless communications, the transmitter module communicatively coupled with the control module; and
   wherein the control module is further configured to enable the first and second receive chains when wireless communications are transmitted using the transmit chain.

5. The apparatus of claim 4, wherein the transmit chain and first receive chain are communicatively coupled to a first antenna and transmit and receive wireless communications in duplex using the first antenna.

6. The apparatus of claim 5, wherein the second receive chain is communicatively coupled to a second antenna and receives wireless communications using the second antenna.

7. The apparatus of claim 4, wherein the predetermined threshold is set based on activity on the transmit chain.

8. The apparatus of claim 7, wherein the predetermined threshold is increased when there is activity on the transmit chain, and the predetermined threshold is decreased when there is no activity on the transmit chain.

9. The apparatus of claim 1, wherein the predetermined threshold (i) is set at a first value when the historical usage data indicates neither increased or decreased likelihood of receiving wireless communications directed to the wireless communications apparatus, (ii) is set at a second value corresponding to a longer elapsed idle time than the first value when the historical usage data indicates increased likelihood of receiving wireless communications directed to the wireless communications apparatus, and (iii) is set at a third value corresponding to a shorter elapsed idle time than the first value when the historical usage data indicates decreased likelihood of receiving wireless communications directed to the wireless communications apparatus.

10. The apparatus of claim 1, wherein the control module is further configured to determine a data rate for data reception on the first receive chain when wireless communications are received at the wireless communications apparatus, and disable the second receive chain when the data rate meets a predefined data rate.

11. The apparatus of claim 10, wherein the predefined data rate threshold corresponds to a maximum achievable data rate for the first receive chain.

12. The apparatus of claim 10, further comprising a third receive chain configured to receive wireless communications on a third wireless communications channel, and wherein the control module is further configured to disable one or more of the second and third receive chains when the data rate meets one or more predefined data rate thresholds.

13. The apparatus of claim 1, further comprising a third receive chain configured to receive wireless communications on a third wireless communications channel, and wherein the control module is communicatively coupled with the third receive chain and further configured to:
  enable the first and second receive chains when wireless communications are received;
  determine a type of data received at the first receive chain; and
  enable the third receive chain based on the type of data received.

14. The apparatus of claim 1, wherein the control module is further configured to determine a Signal to Interference-plus-Noise Ratio (SINR) for data reception on the first receive chain and disable the second receive chain when the SINR meets or exceeds a predefined SINR threshold.

15. A method for reducing power consumption in a wireless communications apparatus, comprising:
  receiving, using a first receive chain, wireless communications on a first wireless communications channel;
  receiving, using a second receive chain, wireless communications on a second wireless communications channel;
  monitoring an elapsed idle time during which wireless communications on the first and second receive chains of the wireless communications apparatus are idle;
  disabling the second receive chain when the elapsed idle time exceeds a predetermined threshold;
  enabling the second receive chain when wireless communications directed to the wireless communications apparatus are received at the first receive chain; and
  adjusting the predetermined threshold based at least in part on historical usage data, such that the predetermined threshold is increased based at least in part on a determination that the historical usage data indicates an increased likelihood of receiving wireless communications during a first time period, and such that the predetermined threshold is decreased based at least in part on a determination that the historical usage data indicates a decreased likelihood of receiving wireless communications during a second time period.

16. The method of claim 15, further comprising:
  receiving, using a third receive chain, wireless communications on a third wireless communications channel;
  disabling the third receive chain when the elapsed idle time exceeds the predetermined threshold; and
  enabling the third receive chain when wireless communications directed to the wireless communications apparatus are received at the first receive chain.

17. The method of claim 15, further comprising:
  receiving, using a third receive chain, wireless communications on a third wireless communications channel;
  determining a data rate for data reception on one or more of the first and second receive chains; and
  disabling one or more of the second and third receive chains when the data rate meets one or more predefined data rate thresholds.

18. The method of claim 15, further comprising:
  determining a type of data being received from on the first and second receive chains; and
  enabling at least a third receive chain based on the type of data being received.

19. The method of claim 15, further comprising:
  transmitting, using a transmit chain, wireless communications from the wireless communications apparatus;
  enabling the second receive chain when wireless communications are transmitted using the transmit chain;
  monitoring elapsed idle time during which wireless communications on the first and second receive chains of the wireless communications apparatus are idle; and
  disabling the second receive chain when the elapsed idle time exceeds the predetermined threshold.

20. The method of claim 19, further comprising: adjusting the predetermined threshold based on activity on the transmit chain.

21. The method of claim 20, wherein adjusting comprises:
  increasing the predetermined threshold when there is activity on the transmit chain; and
  decreasing the predetermined threshold when there is no activity on the transmit chain.

22. The method of claim 15, wherein adjusting comprises:
  setting a first predetermined threshold when the historical usage data indicates neither increased or decreased likelihood of wireless communications;
  setting a second predetermined threshold that corresponds to a longer elapsed idle time than the first predetermined threshold when the historical usage data indicates increased likelihood of wireless communications; and
  setting a third predetermined threshold that corresponds to a shorter elapsed idle time than the first predetermined threshold when the historical usage data indicates decreased likelihood of wireless communications.

23. The method of claim 15, further comprising:
  determining a data rate for data reception on the first receive chain; and
  disabling the second receive chain when the data rate meets a predefined threshold.

24. The method of claim 23, wherein the predefined threshold corresponds to a maximum achievable data rate for the first receive chain.

25. The method of claim 15, further comprising:
  determining a Signal to Interference-plus-Noise Ratio (SINR) for data reception on the first receive chain; and
  disabling the second receive chain when the SINR meets or exceeds a predefined threshold.

26. A wireless communications apparatus, comprising:
  first receiving means for receiving wireless communications on a first wireless communications channel;
  second receiving means for receiving wireless communications on a second wireless communications channel;
  means for monitoring an elapsed idle time during which wireless communications on the first and second receiving means of the wireless communications apparatus are idle;
  means for disabling the second receiving means when the elapsed idle time exceeds a predetermined threshold;

means for enabling the second receiving means when wireless communications directed to the wireless communications apparatus are received at the first receiving means; and means for adjusting the predetermined threshold based at least in part on historical usage data, such that the predetermined threshold is increased based at least in part on a determination that the historical usage data indicates an increased likelihood of receiving wireless communications during a first time period, and such that the predetermined threshold is decreased based at least in part on a determination that the historical usage data indicates a decreased likelihood of receiving wireless communications during a second time period.

27. The apparatus of claim 26, further comprising:
third receiving means for receiving wireless communications on a third wireless communications channel;
means for disabling the third receiving means when the elapsed idle time exceeds the predetermined threshold; and
means enabling the third receiving means when wireless communications directed to the wireless communications apparatus are received at the first receiving means.

28. The apparatus of claim 26, further comprising:
third receiving means for receiving wireless communications on a third wireless communications channel;
means for determining a data rate for data reception on one or more of the first and second receiving means; and
means for disabling one or more of the second and third receiving means when the data rate meets one or more predefined data rate thresholds.

29. The apparatus of claim 26, further comprising:
third receiving means for receiving wireless communications on a third wireless communications channel;
means for determining a type of data being received from on the first and second receiving means; and
means for enabling the third receiving means based on the type of data being received.

30. The apparatus of claim 26, further comprising:
transmitting means for transmitting wireless communications from the wireless communications apparatus;
means for enabling the second receiving means when wireless communications are transmitted using the transmitting means;
means for monitoring elapsed idle time during which wireless communications directed to the wireless communications apparatus are idle; and
means for disabling the second receiving means when the elapsed idle time exceeds the predetermined threshold.

31. The apparatus of claim 30, wherein the transmitting means and first receiving means are interconnected to a first antenna and transmit and receive wireless communications in duplex using the first antenna.

32. The apparatus of claim 30, further comprising:
means for adjusting the predetermined threshold based on activity on the transmitting means.

33. The apparatus of claim 32, wherein adjusting the predetermined threshold comprises:
increasing the predetermined threshold when there is activity on the transmitting means; and
decreasing the predetermined threshold when there is no activity on the transmitting means.

34. The apparatus of claim 26, wherein adjusting the predetermined threshold comprises:
setting a first predetermined threshold when the historical usage data indicates neither increased or decreased likelihood of wireless communications;
setting a second predetermined threshold that corresponds to a longer elapsed idle time than the first predetermined threshold when the historical usage data indicates increased likelihood of wireless communications; and
setting a third predetermined threshold that corresponds to a shorter elapsed idle time than the first predetermined threshold when the historical usage data indicates decreased likelihood of wireless communications.

35. The apparatus of claim 26, further comprising:
means for determining a data rate for data reception on the first receiving means; and
wherein the means for disabling the second receiving means disable the second receiving means when the data rate meets a predefined threshold.

36. The apparatus of claim 35, wherein the predefined threshold corresponds to a maximum achievable data rate for the first receiving means.

37. The apparatus of claim 26, further comprising:
means for determining a Signal to Interference-plus-Noise Ratio (SINR) for data reception on the first receiving means; and
wherein the means for disabling the second receiving means disable the second receiving means the SINR meets or exceeds a predefined threshold.

38. A computer program product comprising:
non-transitory computer-readable medium comprising:
code for receiving, using a first receive chain, wireless communications on a first wireless communications channel;
code for receiving, using a second receive chain, wireless communications on a second wireless communications channel;
code for monitoring an elapsed idle time during which wireless communications on the first and second receive chains of the wireless communications apparatus are idle;
code for disabling the second receive chain when the elapsed idle time exceeds a predetermined threshold;
code for enabling the second receive chain when wireless communications directed to the wireless communications apparatus are received at the first receive chain and;
code for adjusting the predetermined threshold based at least in part on historical usage data, such that the predetermined threshold is increased based at least in part on a determination that the historical usage data indicates an increased likelihood of receiving wireless communications during a first time period, and such that the predetermined threshold is decreased based at least in part on a determination that the historical usage data indicates a decreased likelihood of receiving wireless communications during a second time period.

39. The computer program product of claim 38, further comprising:
code for receiving, using a third receive chain, wireless communications on a third wireless communications channel;
code for disabling the third receive chain when the elapsed idle time exceeds the predetermined threshold; and
code for enabling the third receive chain when wireless communications directed to the wireless communications apparatus are received at the first receive chain.

40. The computer program product of claim 38, further comprising:

code for receiving, using a third receive chain, wireless communications on a third wireless communications channel;

code for determining a data rate for data reception on one or more of the first and second receive chains; and code for disabling one or more of the second and third receive chains when the data rate meets one or more predefined data rate thresholds.

41. The computer program product of claim 38, further comprising:

code for determining a type of data being received from on the first and second receive chains; and code for enabling at least a third receive chain based on the type of data being received.

42. The computer program product of claim 38, further comprising:

code for transmitting, using a transmit chain, wireless communications from the wireless communications apparatus;

code for enabling the second receive chain when wireless communications are transmitted using the transmit chain;

code for monitoring elapsed idle time during which wireless communications directed to the wireless communications apparatus are idle; and code for disabling the second receive chain when the elapsed idle time exceeds the predetermined threshold.

43. The computer program product of claim 42, further comprising:

code for adjusting the predetermined threshold based on activity on the transmit chain.

44. The computer program product of claim 43, wherein the code for adjusting comprises:

code for increasing the predetermined threshold when there is activity on the transmit chain; and code for decreasing the predetermined threshold when there is no activity on the transmit chain.

45. The computer program product of claim 38, wherein the code for adjusting comprises:

code for setting a first predetermined threshold when the historical usage data indicates neither increased or decreased likelihood of wireless communications;

code for setting a second predetermined threshold that corresponds to a longer elapsed idle time than the first predetermined threshold when the historical usage data indicates increased likelihood of wireless communications; and code for setting a third predetermined threshold that corresponds to a shorter elapsed idle time than the first predetermined threshold when the historical usage data indicates decreased likelihood of wireless communications.

46. The computer program product of claim 38, further comprising:

code for determining a data rate for data reception on the first receive chain; and code for disabling the second receive chain when the data rate meets a predefined threshold.

47. The computer program product of claim 46, wherein the predefined threshold corresponds to a maximum achievable data rate for the first receive chain.

48. The computer program product of claim 38, further comprising:

code for determining a Signal to Interference-plus-Noise Ratio (SINR) for data reception on the first receive chain; and code for disabling the second receive chain when the SINR meets or exceeds a predefined threshold.

* * * * *